Aug. 26, 1969  J. J. FRY  3,463,891
CONTROL UNITS FOR VALVE ACTUATORS
Filed Nov. 3, 1967  4 Sheets-Sheet 1

INVENTOR
JEREMY J. FRY
BY Stevens, Davis, Miller & Mosher
ATTORNEYS

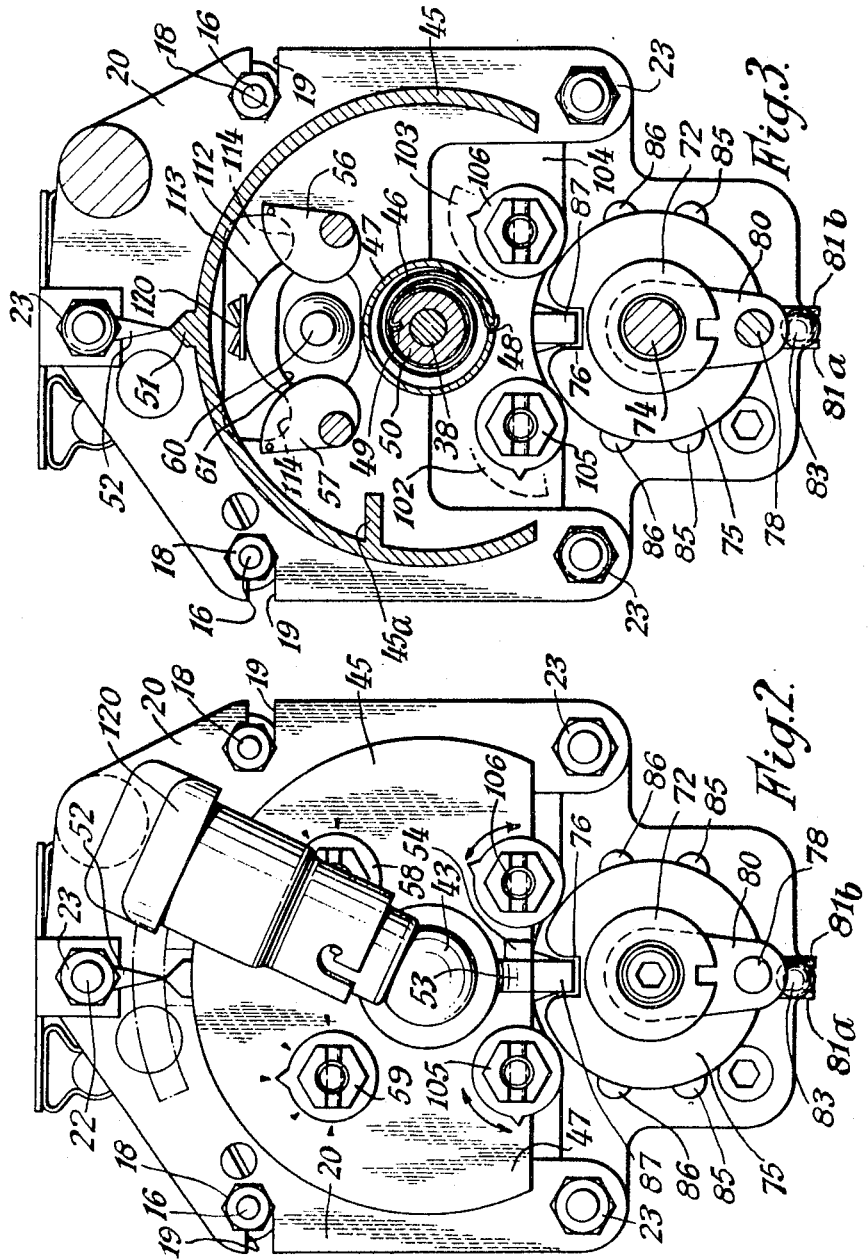

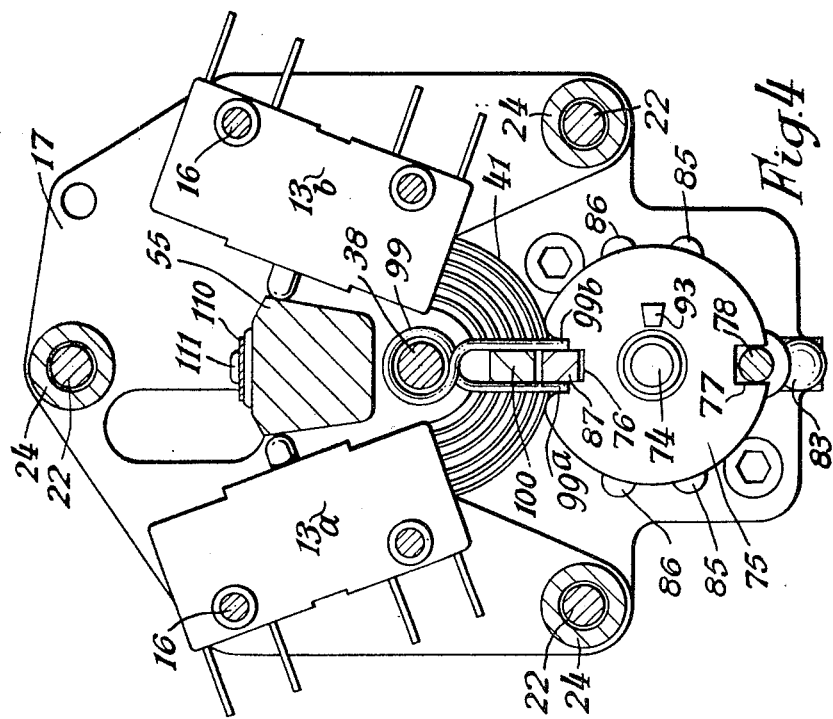
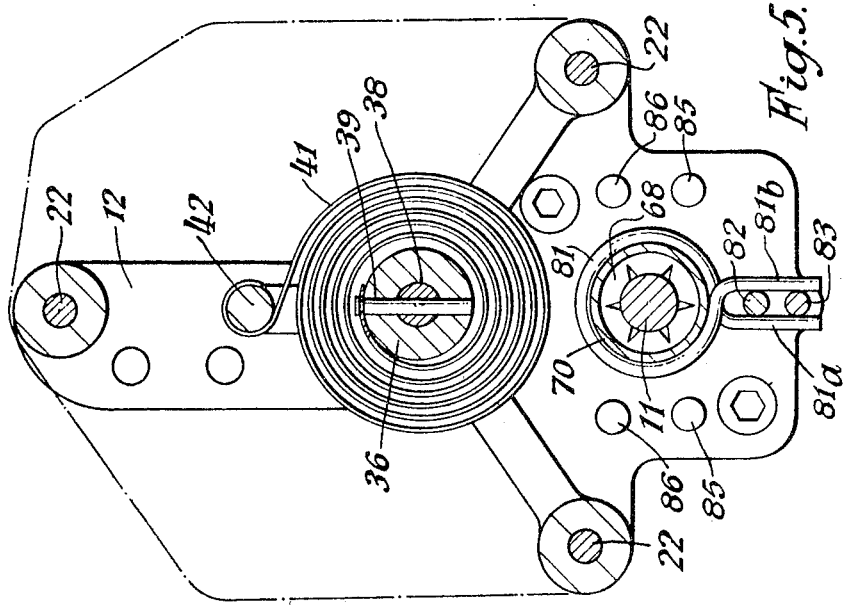

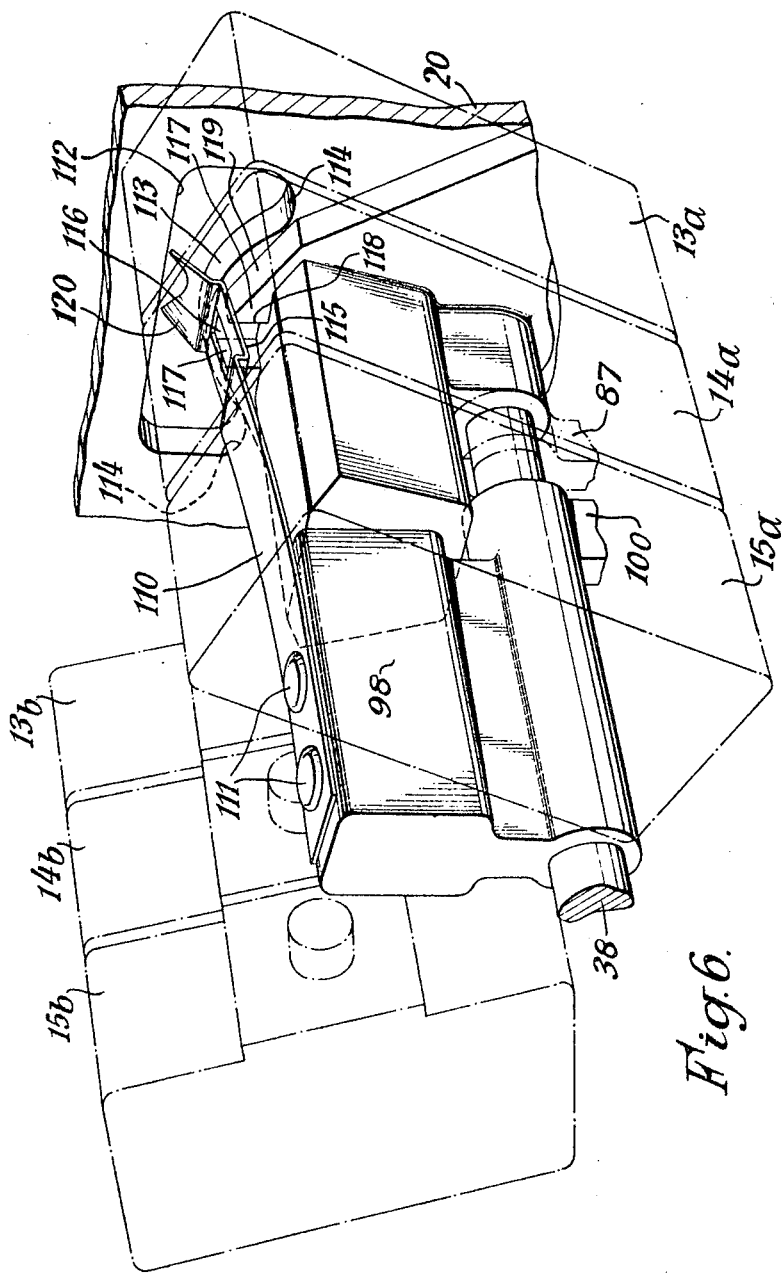

United States Patent Office 3,463,891
Patented Aug. 26, 1969

3,463,891
CONTROL UNITS FOR VALVE ACTUATORS
Jeremy J. Fry, Bath, Somerset, England, assignor to Rotork Engineering Company Limited, Somerset, England
Filed Nov. 3, 1967, Ser. No. 680,579
Claims priority, application Great Britain, Dec. 15, 1966, 56,137/66
Int. Cl. H01h *3/16, 15/14*
U.S. Cl. 200—47    11 Claims

ABSTRACT OF THE DISCLOSURE

A control unit for a valve actuator includes a pair of switches connected in the electrical circuits controlling the energisation of the actuator motor. The switches are actuated by a striker plate mounted between them and which is movable in one or other direction in response to the output movement or the output force of the actuator. A latching member is engageable with the striker plate in a switch operating position so as to prevent a reverse movement of the striker plate to operate the other switch in response to an output force until the latching member has been dis-engaged by an output movement of the actuator in the opposite direction.

---

This invention relates to control units for valve actuators whereby ancillary circuits or operations are controlled by the movement of the actuator.

The invention has particular use with actuators of the kind described in my U.S. Patent No. 3,198,033 and which include an output spindle or shaft which is capable of rotary movement to open or close the associated valve. The output shaft is selectively rotated by manual means or by a motor driven shaft which operates through a worm and wormwheel. The motor shaft is mounted for limited axial movement in response to any undue increase in the torque required for moving the valve to the desired position.

The control unit utilises the rotary movement of the output shaft of the actuator to operate switches for de-energising the motor of the actuator when a predetermined position has been reached in either direction of movement. The control unit also utilises the axial movement of the motor driven shaft to operate additional or the same switches for de-energising the motor of the actuator when the output force of the actuator exceeds a predetermined amount.

The invention is concerned with a control unit of the kind which forms part of the actuator and which includes a plurality of switches arranged in two banks for operation depending upon the direction of movement of the actuator. A switch striker plate is mounted between the switches for pivotal movement in one or other direction to actuate the corresponding switch, and this movement is obtained selectively in response to an increase in the output force exerted by the actuator or in response to the output movement of the actuator.

In prior constructions of this kind difficulty has occurred when the control unit is operating to trip the switches in accordance with the output movement of the actuator. The main difficulty has been that when the motor is de-energised, for example, when the valve has reached its closed position, it usually requires a greater torque to move the valve towards its open position, particularly if the valve has remained closed for any length of time. In prior arrangements energisation of the actuator in the open direction to try to open the valve has immediately caused an axial movement of the motor driven shaft in the opposite direction due to the considerable increase in output force, and this has resulted in the switch striker plate pivoting across to operate the other switch thus de-energising the actuator motor without effecting any opening movement of the valve.

It is an object, therefore, of the present invention to avoid the above disadvantage and to provide a latching arrangement which will prevent the above-mentioned pivotal movement of the switch striker plate until the actuator has begun to move from its closed or initial position.

According to the invention there is provided a control unit for an actuator, said control unit comprising a pair of switches positioned opposite each other and each connected in an electrical circuit for controlling the actuator motor, and a switch striker plate mounted between said switches and movable in response to the output movement or the output force of the actuator to operate one or other of said switches to de-energise the motor, wherein a latching member is adapted to engage said switch striker plate when said plate moves to a switch operating position in response to an output movement of said actuator, and said latching member is operable to prevent a subsequent reverse movement of said switch striker plate to operate the opposite switch in response to an output force of the actuator until the latching member has been disengaged therefrom by an output movement of the actuator in the opposite direction.

In the preferred embodiment of the invention the latching member comprises a spring which is carried by an auxiliary striker blade movable with the switch striker plate when the plate pivots to operate a switch as the output movement reaches a predetermined limit position. The latch spring is normally held spaced from the switch striker plate but in the switch operating position of the plate the latch spring is moved by the auxiliary striker blade to a released position which permits the latch spring to engage a projection on the switch striker plate.

The arrangement is such that the switch striker plate cannot, therefore, move to actuate the other motor switch in response to an output force of the actuator (e.g. when the actuator is energised in the opposite direction and the valve is stuck) until the actuator has positively moved the valve a predetermined amount to pivot the auxiliary striker blade and thereby release the switch striker plate from the latch spring.

The auxiliary striker blade may also operate switches and the latching movement of the spring may be controlled by a suitably shaped cam surface formed in a fixed part of the control unit structure.

The invention will now be described by way of example with reference to the acompanying drawings, in which:

FIGURE 2 is a front view of a control unit of FIGURE 1;

FIGURE 3 is a sectional view taken along the line III—III of FIGURE 1;

FIGURE 4 is a sectional view taken on the line IV—IV of FIGURE 1;

FIGURE 5 is a sectional view taken on the line V—V of FIGURE 1; and

FIGURE 6 is a perspective rear view of the latching spring assembly on the auxiliary striker blade and switch striker plate.

Figure 1:
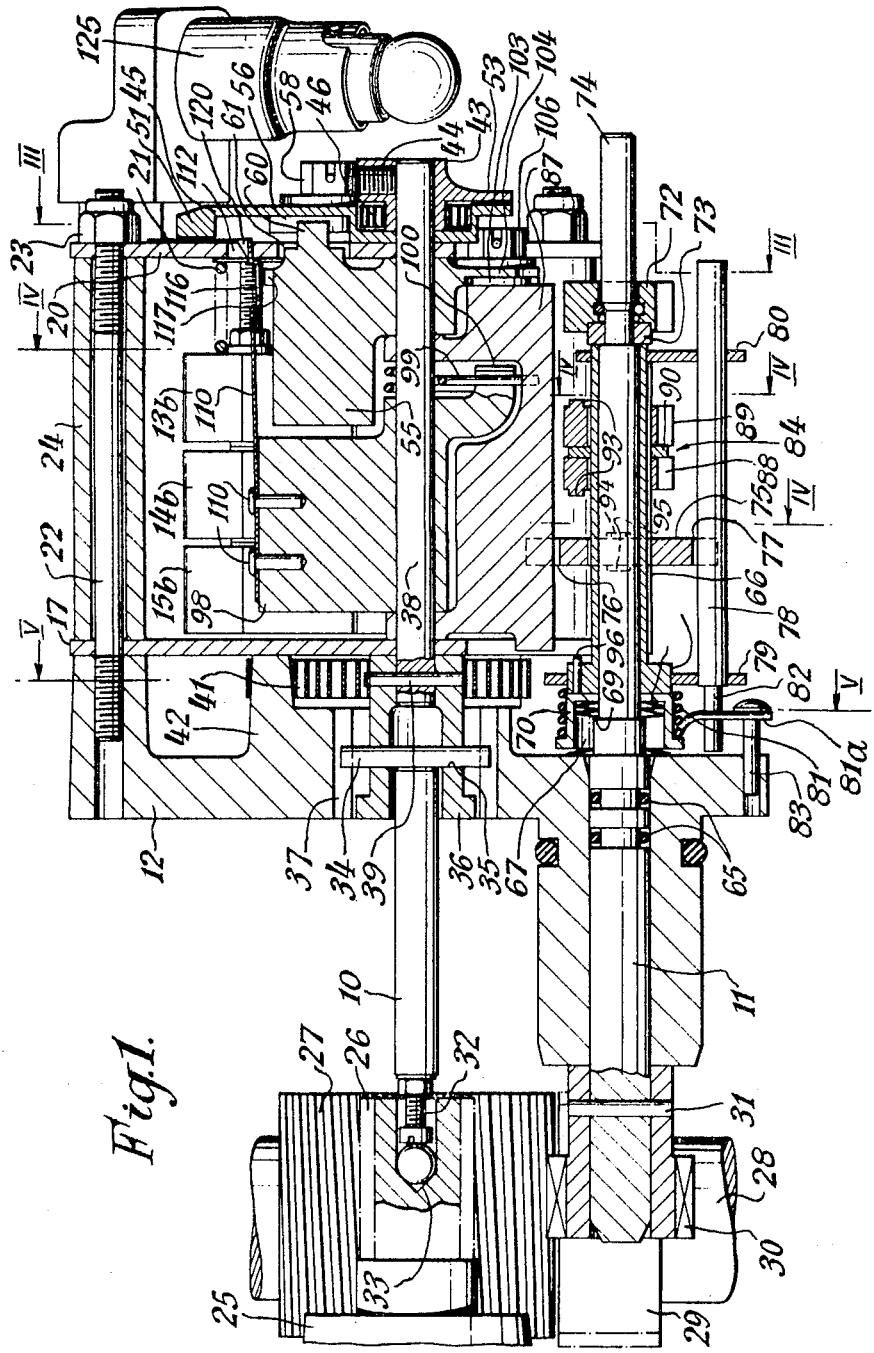
FIGURE 1 is a longitudinal section through the control unit and illustrating also the connection of the control unit with the output mechanism of the actuator.

The preferred embodiment of the invention as illustrated in the drawings is particularly applicable to valve actuators; for example the valve actuator as described in my U.S. Patent No. 3,198,033.

The valve actuator described in this patent specification includes a hand/auto arrangement and has a motor shaft or spindle which, by means of a worm and wormwheel, drives an output shaft which may be manually operated if desired.

The control unit of the invention is located in an auxiliary casing (not shown) which forms part of the actuator and is operated in response to the output force or torque and the output movement of the actuator by a pair of shafts 10 and 11 respectively which extend through a base plate or partition 12 into the control unit housing as will be hereinafter described.

The control unit includes a number of switches which are arranged in two banks for operation depending upon the direction of movement of the actuator. In the preferred embodiment as shown in the drawings six switches are provided in two banks of three for operation depending upon the direction of movement of the actuator (see FIGURES 4 and 6). The front pair of switches 13a, and 13b are particularly adapted for the control of the electrical circuit energising the electrical motor of the actuator while the other pairs of switches 14a, 14b and 15a, 15b are utilised in the usual way for the control of ancillary circuits or other operations.

The mounting of each bank of switches is designed so that the switches can be easily removed from the control unit and exchanged. As shown in FIGURE 4 of the drawings, each bank of switches is carried by mounting screws 16 the head of which (not shown) is located in an electrical back plate 17 while a hexagonal nut 18 (FIGURE 2) on the other end of the mounting screw 16 is slotted into a suitably shaped hole 19 in an electrical front plate 20. The switches in each bank are retained resiliently in position by a spring 21 (FIGURE 1) located on the mounting screw 16.

The electrical back plate 17 and the electrical front plate 20 are connected together by a number of connecting bolts 22 the heads of which threadably engage in the base plate or partition 12 as shown particularly in FIGURE 1 of the drawings while the other end is provided with a clamping nut 23, the bolt 22 being provided with a spacer member 24 for maintaining the electrical plates correctly positioned.

As will be hereinafter described the motor switches 13a, 13b can be selectively operated either as limit switches responsive to the output movement of the actuator or as torque switches responsive to the output force of the actuator. This selection can be made according to the type of pipeline valve to be operated and when the motor switches 13a, 13b are operated as limit switches the motor will be de-energised when the valve has moved to predetermined positions as controlled by the setting of the limit switch actuating mechanism of the control unit. When the motor switches 13a, 13b operate as torque responsive switches the motor will be de-energised in response to any increase in the output force of the actuator above a predetermined value and which is transmitted to the control unit by the motor shaft of the actuator which is mounted for limited axial movement in either direction as described in my U.S.A. Patent No. 3,198,033.

The main casing of the actuator supports the motor shaft which is shown in FIGURE 1 of the drawings by the reference 25 and on which is mounted a worm 26 engaging a wormwheel shown diagrammatically at 27 on the output shaft 28. The output shaft 28 is provided with a worm 29 meshing with a wormwheel 30 fixedly mounted by a pin 31 to the limit switch shaft 11 previously mentioned. The limit switch shaft 11 is therefore rotatably driven in one or other direction in accordance with the rotational movement of the output shaft 28 and this movement of the limit shaft is utilised to operate one or more of the switches 13a, 13b, 14a, 14b, 15a and 15b.

The torque responsive mechanism comprises the shaft 10 which as mentioned above is movable axially by the worm or motor shaft 25 of the actuator. The shaft 10 is provided with an adjustable connecting screw 32 which fits within the aperture 33 in the end of the motor shaft 25.

The other end of the shaft 10 extends into the bore of a torque switch adaptor 36 which abuts against the electrical back plate 17 and is mounted within an aperture in the base plate or partition 12. The end of the shaft 10 pushes against a pin 34 which is carried in a pair of helical slots 35 and which are diametrically opposed in the body of the adaptor. The ends of the pin 34 are located in axial slots 37 in the base plate or partition 12. The ends of the pin 34 are thereby restrained against any rotary movement and any axial movement of the shaft 10 thereby produces axial movement of the pin 34 along the slots 37. This movement of the pin 34 produces a rotary movement of the torque switch adaptor 36 due to the movement of the pin 34 along the helical slots 35 in the adaptor.

One end of a torque shaft 38 is also located in the bore of the torque switch adaptor 36 and is pinned to it by a pin 39. One end of the pin 39 as shown in FIGURE 5 of the drawings also secures one end of a spring 41 the other end of which is located around a projection 42 of the base plate or partition 12. The spring 41 preloads the torque shaft assembly of the shaft 38 and the adaptor 36 and thereby ensures that the complete assembly is always in contact with the end of the shaft 10 so that any axial movement of the worm shaft 25 in either direction will always cause a corresponding rotary movement of the shaft 38. In other words if the shaft 10 moves axially to the left as shown in FIGURE 1 the shaft 38 will rotate due to the following movement of the adaptor 36 by reason of the preloading of the spring 41 acting thereon.

The front end of the shaft 38 extends through the electrical front plate 20 and carries a pointer plate 43 which is fixed to the shaft by means of a grub screw 44. A switch front plate 45 is mounted behind the pointer plate 43 and is freely located on the shaft 38. The switch front plate 45 is connected to the pointer plate 43 by means of a spring 46 which loads a lug 54 on the switch front plate 45 against a projection 53 on the pointer plate 43 (see FIGURE 2). The switch front plate 45 thereby follows the movements of the pointer plate 43 fixedly secured to the shaft 38 without being rigidly connected thereto. As shown in FIGURE 3 of the drawings the spring 46, is located within a circular housing portion 47 formed in the switch front plate 45. One end of the spring 46 is located within a slot 48 formed in the peripheral wall of the housing portion 47 of the plate while the other end of the spring is located in a slot 49 in a projecting portion 50 of the pointer plate 43.

The switch front plate 45 is also provided with a pointer 51 and which is adapted to co-operate with a fixed pointer 52 secured by the nut 23 on the upper connecting member 22. The fixed pointer 52 is mounted externally of the electrical front plate 20 and it permits the initial adjustment of the switch front plate 45 so that the plate 45 can be correctly set to a central position whereby each bank of switches is operated in a similar manner. This initial setting of the plate 45 is obtained by releasing the grub screw 44 and adjusting the pointer plate 43 until the pointer 51 of the plate 45 is opposite fixed pointer 52 carried by the electrical front plate 20.

The motor switches 13a, 13b are selectively actuated by a switch striker plate 55 which is rotatably mounted on the striker shaft 38 and is located between the two switches for operating one or other switch in accordance with the operation of the actuator (see FIGURES 1, 4 and 6).

The switch striker plate 55 is pivotally moved to operate the motor switch 13a or 13b in response to rotary movement of the switch front plate 45. The torque applied by the actuator is set by limiting the amount of rotary movement of the switch front plate 45 before it actually moves the switch striker plate 55 against the appropriate switch 13. This adjustable control is obtained by mounting two adjustable cam members 56, 57 on the inside surface of the switch front plate 45 as shown more clearly in FIGURE 3 of the drawings. The cams 56, 57 are spaced one on each side of the striker shaft 38 and the cams are independently controlled by manually operable knobs 58, 59 located on the front surface of the switch front plate 45 (see FIGURE 2). The cams 56 and 57 are suitably shaped, for example as shown in FIGURE 3 of the drawings, so as to contact a projection 60 of the switch striker plate 55 which extends forwardly through an aperture 61 in the electrical front plate 20 of the control unit (see also FIGURE 1).

The arrangement as described above is such that when the striker shaft 38 is rotated in one or other direction in response to axial movement of the torque shaft 10, this rotation of the striker shaft 38 also rotates the pointer plate 43 and thereby the switch front plate 45. The movement of the switch front plate 45 causes one or other of the cams 56, 57 to contact the switch striker plate 55 which thereby pivots to operate the appropriate motor switch 13a or 13b. It will be appreciated that the switches 13a, 13b are actuated in accordance with an output force or torque the amount of which is determined by the manual setting of the cams 56, 57 carried by the switch front plate 45.

As mentioned above the external manual control for the cams 56, 57 on the switch front plate 45 comprises knobs 58 and 59 which are provided with several positive settings between a minimum and a maximum position. The outer surface of the switch front plate 45 is provided with indicating positions so as to enable the operator to provide the desired torque setting. The particular cam 56 associated with the "open" motor switch 13b may also be provided with a position which will permit the full power of the motor to be used without causing any operation of the motor switch 13b. This position may be indicated on the front surface of the plate 45 by a "boost" position and the design of the cam is such that in this position it will not contact the switch striker plate 55 to operate the plate during the rotation of the switch front plate 45. It is, of course, possible to provide such a position on both cams 56, 57, if desired, so that the cams can be manually adjusted to a position in which neither motor switch 13a, 13b will be controlled in accordance with the output force or torque of the actuator. Normally, however, only the cam 56 operating the "open" motor switch 13b will be provided with a "boost" position and, as shown in FIGURE 3, the cam 57 is prevented from rotating to such a position by a projection 45a extending inwardly of the switch front plate 45.

The control and setting of the torque responsive mechanism by the adjustable cams 56, 57 forms the subject matter of my copending United States patent application Ser. No. 680,506 filed Nov. 3, 1967, entitled Improvements to Control Units for Valve Actuators.

As previously mentioned, the motor switches 13a, 13b may also be operated in accordance with the output movement of the actuator and this limit position control, which will now be described, is also utilised to actuate the additional switches 14 and 15 controlling the ancillary circuits.

The input for the limit input control comprises the limit switch shaft 11 previously mentioned and which extends into the control unit through the base plate or partition 12.

The limit switch shaft 11 is sealed within the base plate or partition 12 by two O-rings 65 and inside the control unit casing the shaft supports on its outer diameter a hollow threaded spindle 66.

The limit switch shaft 11 drives the hollow threaded spindle 66 through a clutch shown generally by the reference numeral 67 and which is mounted on the end of the spindle 66 adjacent the base plate or partition 12. The clutch 67 comprises a set of spring disc washers 68, which washers are located on the shaft 11 and positioned between a shoulder 69 on the shaft and the inner surface of a cup-shaped spacer member 70 which surrounds the spring disc washers 68. The spacer member 70 is engaged by a fixed flange 71 on the adjacent end of the hollow threaded spindle 66 and the spring disc washers 68 are pre-loaded by a clamping nut 72 and washer 73 which are located at the other end of the shaft. The washer 73 abuts the other end of the hollow threaded spindle 66 and the nut 72 is threaded on a shaft 74 which extends from the end of the shaft 11 into which it is fitted for movement therewith, for example for operating a continuously movable indicator pointer (not shown). The adjustment of the nut 72 on the shaft 74 engages the washer 73 against the end of the threaded spindle 66 so as to adjust the loading of the spring disc washers 68 which maintain the friction drive between the shaft 11 and the spindle 66.

A movable nut 75 is threadably mounted on the hollow spindle 66 and is formed with axial slots 76, 77 in its periphery at diametrically opposed positions. The nut 75 is normally held against rotation with the threaded spindle 66 by a nut guide which comprises a rod 78 extending longitudinally with the spindle 66 but spaced therefrom. The rod 78 engages the slot 77 in the nut 75 and it is supported at its ends by plates 79, 80 loosely mounted respectively on the fixed flange 71 and the outer end of the spindle 66.

The nut guide is spring-loaded into a central position as shown in FIGURES 1 and 5 by a return spring 81 which is positioned around the cup-shaped spacer member 70. The ends 81a, 81b of the return spring 81 cross over each other just below the cup-shaped spacer member 70 (see FIGURE 5) and the ends are then located one on each side of an extension 82 of the rod 78 and a fixed retainer pin 83 mounted in the base plate or partition 12.

The nut 75 is therefore constrained to move axially along the hollow spindle 66 in one or other direction depending upon the output movement of the actuator to open or close the associated valve. In the leftward direction of movement, as viewed in FIGURE 1, the travelling nut 75 engages a fixed stop which comprises the fixed flange 71 on the threaded spindle 65, and in the rightward direction of movement it engages an adjustable stop 84 on the spindle 66 as will be hereinafter described. When the travelling nut 75 engages either one of the stop members it is forced to rotate with the hollow threaded spindle 66 and this rotational movement of the nut 75 is utilised to operate the motor swiches 13a, 13b to de-energise the motor of the actuator. For example, the fixed stop member 71 may cause the nut 75 to rotate to deenergise the motor when the valve reaches its closed position, while the adjustable stop 84 can be suitably positioned on the spindle 66 to rotate the nut 75 to de-energise the motor when the valve has moved to a predetermined open position. This movement of the valve to its open position, as determined by the number of turns of the threaded spindle, can be preset for the switch mechanism so that the control unit can be immediately applied to an actuator without any further adjustment.

Excess rotational movement of the nut 75 is prevented by the engagement of the projection 82 of the rod 78 of the nut guide with stops on the base plate or partition 12. Two sets of stops are provided for use depending on the speed of operation of the actuator. The first set of stops (not shown) are positioned in apertures 85 and are intended for low speed actuator operation, while the second set of stops are positioned in apertures 86, and are intended for high speed operation in which case the first stops are tapped into the base plate 12 flush with the face so that the second stops in apertures 86 are used.

The lower edge of a longitudinally extending striker plate 87 engages the other peripheral slot 76 in the travelling nut 75. The striker plate 87 is pivotally mounted about the torque shaft 38. The pivotal movement of the plate 87 by the nut 75 is utilised to actuate the switches 13a, 13b, 14a, 14b, 15a, and 15b as will be hereinafter described.

The adjustable stop member 84 comprises a pair of lock nuts 88 and 89 between which is positioned a locking washer 90. The arrangement forms the subject matter of my copending United States patent application Ser. No. 677,943, filed Oct. 25, 1967, entitled Improvements in or Relating to Control Units More Particularly for the Electrical Circuits of Valve Actuators, to which reference should be made for more detailed information. Briefly however, the threaded surface of the spindle 66 is provided with a flat which extends the whole length of the thread on the spindle 66 so that the cross-sectional shape of the spindle is substantially D-shaped. The locking washer 90 is provided with a D-shaped aperture which corresponds to the cross-sectional shape of the spindle so that the locking washer fits snugly thereon with the flat of the washer fitting the flat of the spindle. The arrangement is such that the washer 90 is adjustable slidably along the spindle 66 but is unable to rotate relatively thereto. The two lock nuts 88 and 89 are therefore tightened against the washer 90 in the desired limit position and the arrangement ensures that the adjustment is positive and non-slipping. No loss of adjustment can occur and it is only necessary to finger tighten the nuts 88 and 89 against the locking washer 90.

The construction of the adjustable stop member 84 is completed by a projection 93 on the outer surface of the lock nut 88. This projection is adapted to engage a corresponding projection 94 on the adjacent surface of the travelling nut 75 in one extreme limit position. The arrangement prevents any binding between the travelling nut 75 and the adjustable stop 84 which would probably occur if the projections were not provided. A similar projection 95 is provided on the other surface of the travelling nut 75 for engagement with a pin 96 mounted in the fixed flange 71 at the end of the spindle 66 in the other extreme limit position. The lock nuts 88 and 89 are, of course, interchangeable and therefore the lock nut 89 is also provided with a similar projection 93 on its outer surface.

The clutch 67 provides a safety device as the limit switch shaft 11 can continue to rotate relatively to the spindle 66 when the travelling nut 75 reaches one of its extreme positions of movement and until the motor in de-energised.

The clutch 67 also provides a self-setting device for the actuator whereby the adjustable stop member 84 may be positioned to suit the limit positions of the valves. For example, after the control unit has been mounted on the actuator, the motor is energised to drive the valve to its closed position and the motor is maintained in operation until the valve is closed irrespective of the engagement of the travelling nut with the fixed stop member i.e., the pin 96 on the fixed flange 71 of the threaded spindle 66, as the clutch 67 will permit relative rotational movement of the shaft 11 and spindle 66. At this time the valve closed position of the actuator is identified with the engagement of the projection 95 on the travelling nut 75 with the pin 96 on the fixed flange 71 and the open position of the valve will be in accordance with the de-energisation of the motor due to the engagement of the travelling nut 75 with the adjustable stop member 84 as described above. The adjustable stop member 84 can be easily and quickly positioned to predetermine the opening movement of the valve by the number of turns along the threaded spindle 66 from the fixed flange 71.

The pairs of switches 14a, 14b and 15a, 15b for the ancillary circuits are operable by an auxiliary striker blade 98 which is also rotatable about the striker shaft 38 and which is resiliently attached to the striker plate 87 by means of a spring connection 99. As shown in FIGURE 4 the spring 99 is located around the shaft 38 and has its ends 99a, 99b crossed and then located one on each side of the projection 100 of the auxiliary striker blade 98 and also the striker plate 87. This arrangement prevents any damage to the switches especially in actuators which operate at a high speed as it prevents overtravel and thus simplifies the setting up of the switches and plate operating mechanism.

The motor switches 13a, 13b are selectively actuated by the limit control mechanism through the switch striker plate 55. The striker plate 87 is drivably connected with the switch striker plate 55 by means of a pair of cams 102, 103 shown in FIGURE 3 of the drawings and which are adjustably mounted on the inside surface of a flat extension 104 at the lower end of the switch striker plate 55. The cams are manually rotatable by knobs 105, 106 on the front of plate 55 and the arrangement is such that the front end of the striker plate 87 will engage one or other of the cams 102, 103 so as to rotate the switch striker plate 55 to operate one or other of the motor switches 13a, 13b. It will be appreciated that by rotating the cams 102, 103 the operation of the motor switches may be set as desired and the cams are so designed as to provide for a position in which the switches 13a, 13b are completely inoperative by the movement of the striker plate 87 so that the motor switches 13a, 13b are solely torque operated. The arrangement is described in greater detail in my above mentioned application Ser. No. 680,506.

Another feature of this arrangement is that the requirement for the auxiliary switches 14a, 14b and 15a, 15b to be operated slightly before the motor switches 13a, 13b is achieved and manufacturing tolerances on the switches which cause a variation in the tripping point are also overcome.

In the operation of the control unit as described above, difficulty sometimes occurs when the motor is de-energised; for example when the valve has reached its closed position. At this time it usually requires a greater torque to move the valve towards its open position particularly if the valve has remained closed for any length of time. In prior arrangements energisation of the actuator in the open direction to try to open the valve has immediately caused an axial movement of the motor driven shaft 25 in the opposite direction due to the considerable increase in output force and this has resulted in the switch striker plate 55 pivoting across immediately to operate the "open' motor switch 13b thus de-energising the actuator motor without effecting any opening movement of the valve.

According to the invention the particular embodiment of the control unit as shown in the drawings avoids this difficulty by providing a latching arrangement which is more clearly shown in FIGURE 6 of the drawings. The latching arrangement comprises a latch spring 110 attached by rivets 111 to the top of the auxiliary striker blade 98 and the front end of which projects into an opening 112 in the electrical front plate 20 (FIGURE 3). The bottom surface of the opening 112 has a curved cam surface having a central upper section 113 and two lower end sections 114 so that in the central position of the auxiliary striker blade 98 the spring 110 is held upwardly by the section 113 of the cam surface in a position as shown in FIGURES 1 and 6 away from the top surface of the switch striker plate 55. The latch spring 110 is provided at its forward end with a depressed portion 115 and which is formed with a square hole 116 therein positioned above the switch striker plate 55. The switch striker plate 55 is provided on its forward edge with a pair of spaced upstanding projections 117 on its upper surface and which are able, in certain positions of the plates 55 and 98, to locate in the hole 116. Each projection 117 is formed by an upstanding straight edge 118 and by an inclined face 119 which slopes away from the top of the straight edge 118 towards the outside of the plate 55 as shown more clearly in FIGURE 6 of the drawings. The square hole 116 in the spring 110 is, therefore, normally positioned centrally between the two projections.

When the control unit is operating in accordance with the output force and output movement of the actuator, energisation of the actuator to close the valve causes the striker plate 87 to pivot as previously described when the valve reaches the "close" position in accordance with the preset conditions of the limit operating mechanism. As previously mentioned, the pivotal movement of plate 87 firstly produces a pivotal movement of the auxiliary striker blade 98 followed by pivotal movement of the switch striker plate 55 to actuate the ancillary circuit switches 14a and 15a and also the "close" motor switch 13a. The initial movement of the blade 98 moves the spring 110 sideways so that the square hole 116 is positioned over the right-hand projection 117 as viewed in FIGURE 6. As the plate 55 and blade 98 continue to pivot the latch spring 110 continues to move with the blade 98 and its front end 120 moves along the cam surface of the opening 112 into the lower end section 114. The front end 120 of the spring 110 is thereby able to move resiliently downwardly as the plates 55 and 59 pivot and during this movement the hole 116 engages firmly over the projection 117 on plate 55. In the "close" position of the plate 55 and blade 98 the plate and blade have pivoted sideways and the latch 110 is firmly engaged with the projection 117 on the striker plate 55. The front end 120 of the latch spring is upturned so as to permit the spring to be disengaged manually from the front of the control unit if necessary.

If now the actuator is operated for opening the valve under normal conditions, if the valve is not stuck, the blade 98 will begin to pivot to return to its central position as soon as the valve begins to move. As this occurs the front end 120 of the latch spring 110 rides up the cam surface and is moved upwardy so that in the central portion 113 of the cam surface the latch will disengage from the projection 117 to allow the switch striker plate 55 to operate independently in accordance with the torque setting.

If, however, the valve is stuck when the actuator is operated the latch spring 110 will prevent the switch striker plate 55 from moving across to operate the "open" switch 13b which would, of course, occur as the actuator tries to move the valve. The latch spring 110 holds the switch striker plate 55 against the "close" switch 13a until the actuator has unseated the valve and the limit switch drive through the shaft 11 has begun to rotate thus moving the auxiliary switch plate 98 back to release the spring 110 as it rides up the cam surface to its central position and thus disengages from the switch striker plate 55.

The arrangement allows two or three turns of the actuator before release of the latch spring 110 which should be sufficient for the actuator to have successfully unstuck the valve so that the possibility of the opposite switch 13b being operated is eliminated.

The mechanism also carries a lamp 125 to illuminate the associated indicating mechanism and which can be easily moved aside to allow access to the adjusting knobs 58, 59, 105, 106. A heater (not shown) may also be provided.

I claim:

1. A control unit utilizing the rotary movement of an output shaft of an actuator to de-energize a motor for the actuator upon said shaft reaching a predetermined position in either direction of movement, said control unit comprising a pair of switch means positioned on opposite sides of said shaft, each switch means adapted to be connected in an electrical circuit for controlling the actuator motor, a switch means striker plate mounted on said shaft between said switch means and selectively movable in response to an increase in the output force exerted by the actuator and in response to the output movement of the actuator to selectively operate one said switch means to de-energize the motor, a latching member adapted to engage said switch means striker plate, when said plate moves into a switch means operating position in response to an output movement of said actuator, and to prevent a subsequent reverse movement of said switch means striker plate to operate the opposite switch means in response to an output force of the actuator until the latching member has been disengaged therefrom by an output movement of the actuator in the opposite direction.

2. A control unit as claimed in claim 1, in which the latching member comprises a spring, an auxiliary striker blade carrying said spring and being movable with the switch means striker plate when the plate pivots to a switch means operating position in response to a predetermined output movement of the actuator shaft.

3. A control unit as claimed in claim 2, wherein the switch means striker plate and the auxiliary striker blade are located side by side for pivotal movement on a support shaft.

4. A control unit as claimed in claim 3, wherein said spring of said latching member extends across said switch striker plate and is normally held spaced therefrom.

5. A control unit as claimed in claim 4, wherein one end of the spring is rigidly attached to said auxiliary striker blade and the other end is slidably moutned on a cam surface.

6. A control unit as claimed in claim 5, in which the cam surface is shaped to support said spring spaced from said switch means striker plate when said plate and the auxiliary striker blade are centrally positioned with respect to said switches.

7. A control unit as claimed in claim 6, wherein the cam surface is shaped at its ends to release said other end of the latch spring when the switch means striker plate and auxiliary striker blade pivot to a switch means operating position to permit the latch spring to engage with said switch means striker plate.

8. A control unit as claimed in claim 7, wherein said spring includes means adapted to engage a projection on said switch means striker plate.

9. A control unit as claimed in claim 8, wherein the switch means striker plate is formed with two spaced projections and said means on said spring being located above and between said projections when said plate is in its central position.

10. A control unit as claimed in claim 5, in which the cam surface comprises the shaped lower edge of an opening formed in a front plate of the unit.

11. A control unit as claimed in claim 2, in which the auxiliary switch blade is movable to operate separate switches in ancillary circuits in response to predetermined output movements of the shaft of said actuator.

References Cited

UNITED STATES PATENTS

| 2,869,395 | 1/1959 | Allison et al. | 74—527 |
| 3,209,090 | 9/1965 | Fry | 200—47 |
| 3,260,805 | 7/1966 | Pihl | 74—527 X |

MILTON KAUFMAN, Primary Examiner

U.S. Cl. X.R.

74—527; 192—141